Oct. 2, 1956  R. G. SCHMITT ET AL  2,765,234
METHOD OF PREPARING A FOOD PRODUCT FROM A FROZEN CONCENTRATE
Filed April 29, 1952  4 Sheets-Sheet 3
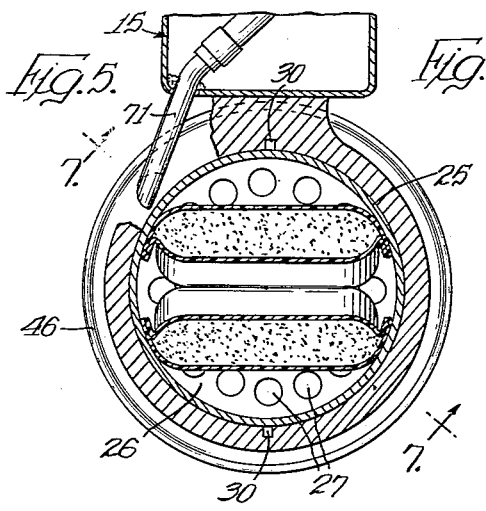
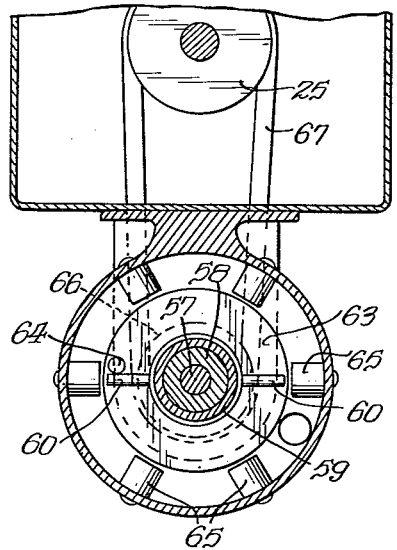
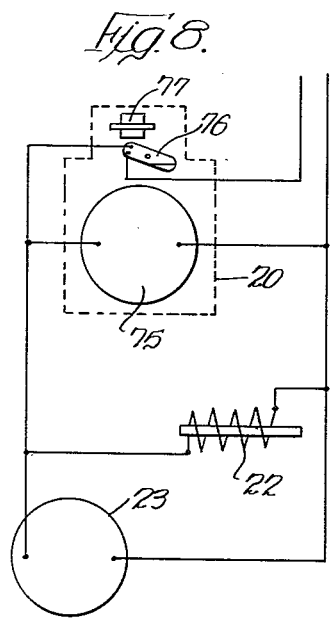
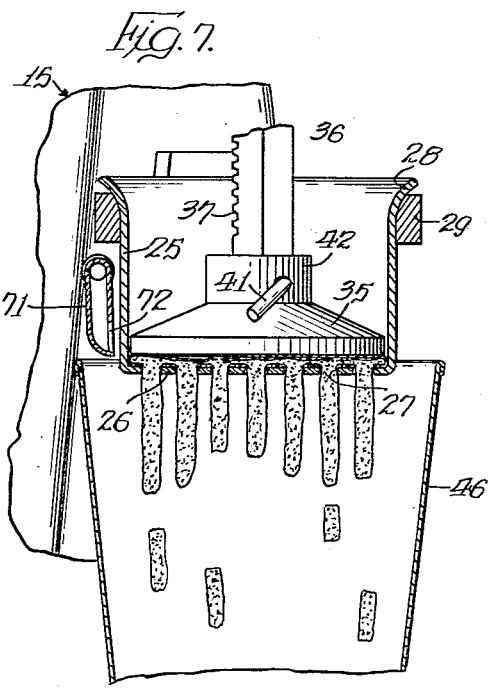
INVENTORS.
Roland G. Schmitt
Howard W. Raddatz
Vernon Swedberg
By: Blumung & Blumung Attys.

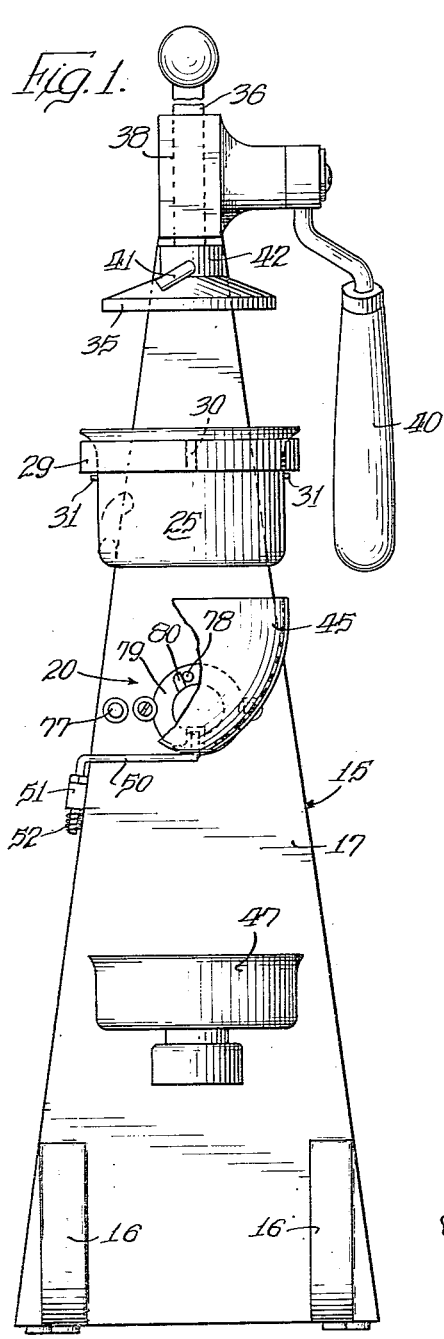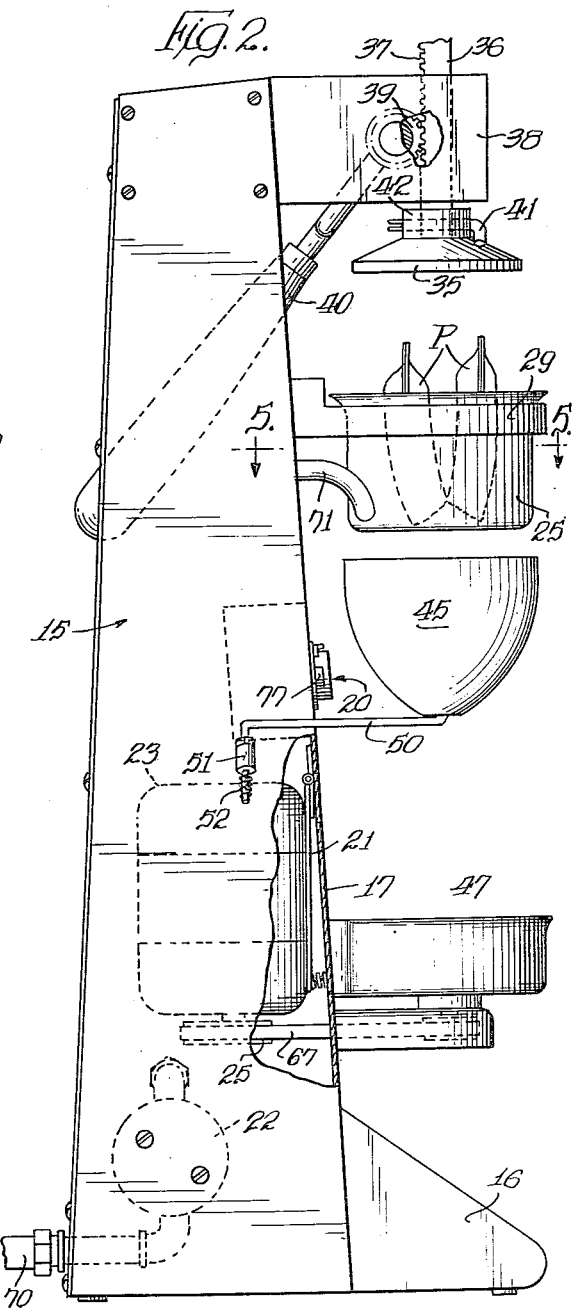

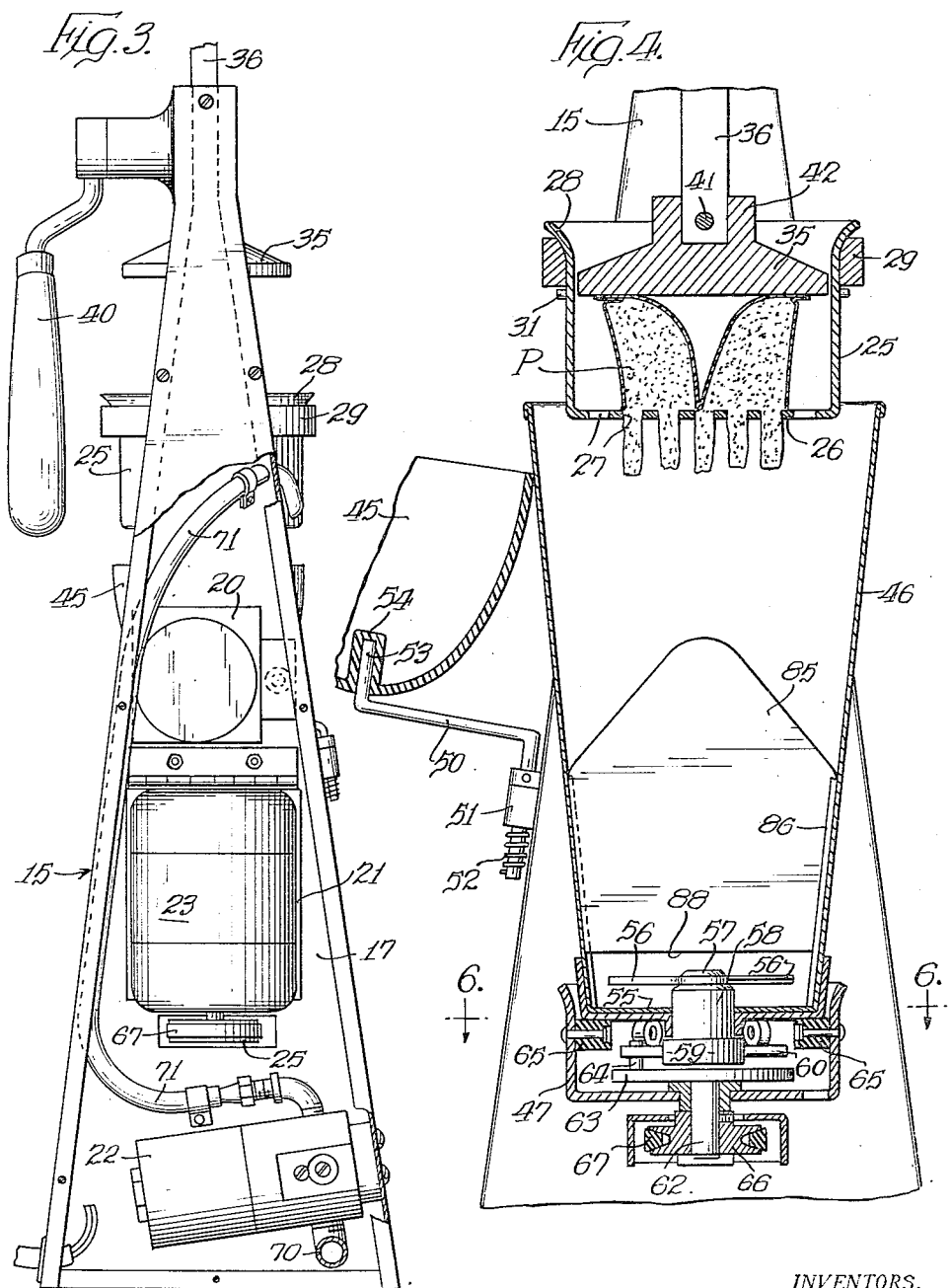

Oct. 2, 1956 — R. G. SCHMITT ET AL — 2,765,234
METHOD OF PREPARING A FOOD PRODUCT FROM A FROZEN CONCENTRATE
Filed April 29, 1952 — 4 Sheets-Sheet 4
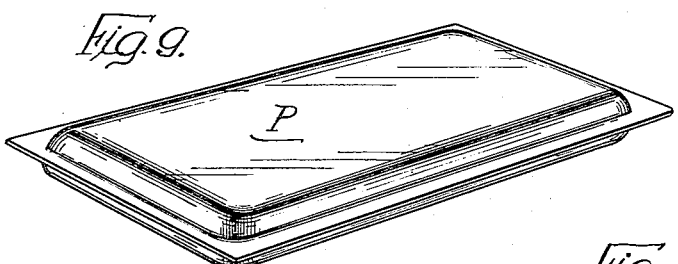
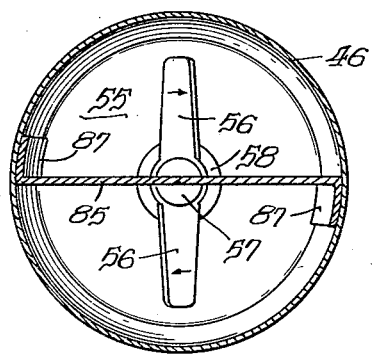
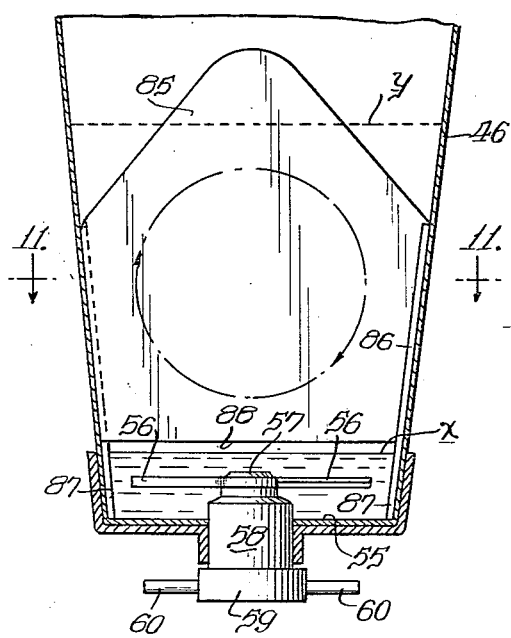
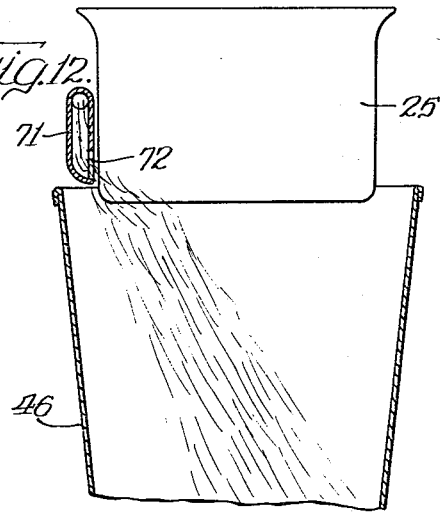
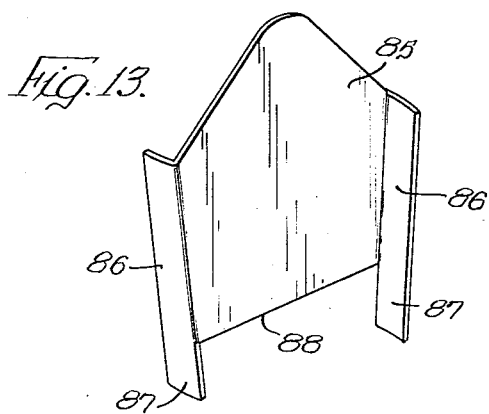
INVENTORS.
Roland G. Schmitt
Howard W. Raddatz
Vernon Swedberg

United States Patent Office 2,765,234
Patented Oct. 2, 1956

2,765,234

METHOD OF PREPARING A FOOD PRODUCT FROM A FROZEN CONCENTRATE

Roland G. Schmitt, Chicago, Howard W. Raddatz, Evergreen Park, and Vernon Swedberg, Chicago, Ill., assignors to Walgreen Co., Chicago, Ill., a corporation of Illinois Application April 29, 1952, Serial No. 284,982

4 Claims. (Cl. 99—193)

The invention relates generally to a method of preparing a food product, and more particularly to a method of preparing a food product from a food concentrate, including particularly a frozen food concentrate.

A general object of the invention is to provide a method of food preparation in which a concentrate of the natural product is packaged for individual servings, maintained at a proper temperature for maximum preservation of food values, and quickly converted from a food concentrate to a whole food product immediately prior to serving.

One of the more particular objects of the invention is to provide a new and improved method of preparing a food product from a food concentrate in which the time lapse from opening of the package containing the concentrate to the completion of the food product is a minimum so as to preclude to the maximum extent possible the loss of food values normally occurring during the preparation.

Another object is to provide a method of preparing a food product from a food concentrate in which discharge of the concentrate from its package is accompanied by a preliminary reduction thereof to small size pieces, and in which the addition of extraneous ingredients, the mixing thereof with the concentrate, and the final comminution of the concentrate progresses simultaneously.

Another object is to provide a method of preparing a food product from a food concentrate in which the concentrate is frozen, is maintained at a temperature well below freezing until the time of use, and at the time of use is reduced to pieces of small size as an incident to discharge from its package, and is further and finally comminuted and liquified coincidentally with addition of liquid to provide the necessary bulk or dilution.

Another object is to provide means for controlling the degree of aeration imparted to the product during the stage of comminution of the concentrate, whereby the addition of air to a greater or lesser extent may be predetermined.

An apparatus embodying the features of this invention, and suitable for carrying out the process herein to be disclosed is illustrated in the accompanying drawings wherein:

Figure 1 is a front elevational view of the apparatus in its entirety;

Fig. 2 is a fragmentary side elevational view of the lower portion of the apparatus;

Fig. 3 is a view in elevation, looking toward the rear of the apparatus, a portion of the standard housing being broken away to exhibit certain of the operating parts interiorly thereof;

Fig. 4 which is a fragmentary detail in vertical section taken through the meshing cup and mixing cup therebelow, shows the meshing and mixing cups together with the aeration control baffle within the latter;

Fig. 5 is a detail in horizontal section, taken on line 5—5 of Fig. 2;

Fig. 6 is a similar view, taken on line 6—6 of Fig. 4;

Fig. 7 is a detail in vertical section, taken on line 7—7 of Fig. 5;

Fig. 8 is a diagram of the wiring comprised in the electrical system which controls the mixing and water discharge operations;

Fig. 9 is a view in perspective of one of the sealed packages containing frozen food concentrate as it appears when first taken from the refrigerator to be operated upon;

Fig. 10 is a fragmentary detail in vertical section through the lower portion of the mixing cup, showing the whirling motions of the liquid beverage therein at about the conclusion of the mixing operation;

Fig. 11 is a transverse section, taken on line 11—11 of Fig. 10;

Fig. 12 is a vertical sectional fragmentary view showing the course of the water when discharged against the side of the mashing cup on route to the bottom of the mixing cup; and Fig. 13 is a view in perspective of the aeration baffle control plate per se.

This invention contemplates a method of food preparation which involves the now well-known step of forming a concentrate of the food through the extraction of water from the food, typical examples being powdered milk, powdered eggs, and the frozen fruit juices. In the past the resulting food concentrate has been packaged with such quantity of concentrate in each package as to provide a whole food product of many servings for one individual. The result has been that the whole or restored food product is permitted to stand around for a considerable period of time during which partial or substantial loss of food values and deterioration of the product occurs, depending largely upon the nature of the product involved. In its broad aspects, therefore, this invention contemplates packaging of the food concentrate in quantities sufficient to make a serving for one person only, with the method of converting the food concentrate to a food product so quickly and simply executed and controlled, and the apparatus for carrying out the method so efficient and speedy in its operation as to make it economically possible to prepare the whole or restored food product in individual servings.

While the invention encompasses all types of foods regardless of whether the concentrate is powdered or granular, a frozen mass, or a syrup, the invention will for purposes of clarity of disclosure be described in connection with frozen fruit juice concentrate.

At present the frozen concentrate is packaged in metal cans the smallest of which contains 6 ozs., and when restored to the whole food product a large number of normal sized servings are provided. The frozen concentrate is, of course, also packaged in much larger containers for use by restaurants, hotels and other commercial establishments. In commercial establishments it is the practice to mix very substantial quantities at one time, which means that the food product stands around for hours on end during much of which time it cannot be properly refrigerated. Even in the home one 6 oz. can of fruit juice concentrate makes more than enough juice for a serving for an average size family, and thus here also the juice is then permitted to stand around twenty-four hours or more during which time, though it is retained in a refrigerator, it is still not held at the proper temperature to prevent deterioration of the juice, for it has been found that to prevent loss of vitamins and other food values from citrus fruit juices the concentrate and the restored whole juice should be kept well below freezing, preferably at about 6° F.

In the method hereinafter disclosed and claimed, the fruit juice concentrate is enclosed in a flexible and pliable package P in the form of a relatively flat bag about 5" in length, 3" in width, and varying in thickness from ⅝" throughout its middle portion to substantially nothing at the sides and ends (see Fig. 9). The bag or container is composed of one of the plastics and holds about 2½ oz. of fruit juice concentrate. This is the quantity required to make one large serving of fruit juice of the type purchased at lunch counters, fountains, and like places, the serving being about 10 oz. Once packaged, the concentrate will at all times be kept under proper refrigeration including the time of shipment from the manufacturing plant to the dispensing restaurant, grill, or soda fountain or to the retailer who will sell the same. When a serving of fruit juice is to be made, the package is slit upon one of its faces, the concentrate is extruded into a receptacle, and water is added concurrently with the application of a mixing treatment which comminutes and liquifies the concentrate to produce a complete diffusion thereof with the water. Preferably the step of extruding the concentrate from the package involves the application thereto of pressure sufficient to mash and reduce the concentrate to small size pieces which are readily susceptible to comminution and liquefaction. The addition of water and the operation of mixing is preferably carried on simultaneously so that only a matter of seconds is required to complete preparation of the product for serving. The result is an unusually fresh and palatable beverage with substantially no loss of vitamins or other food values because the period of time during which the loss or deterioration can occur has been reduced to a minimum.

While the method can be carried out manually or by a variety of apparatus, there is shown in the drawings and will hereinafter be described a preferred apparatus. As herein illustrated for purposes of disclosure, the apparatus comprises a standard 15 constructed to provide a housing that is enlarged in its base portion and provided with a forward extension in the form of a pair of spaced arms 16. Carried on the rear face of the front wall 17 of the standard is a timer mechanism 20, a hinged mounting plate 21, and a solenoid-operated valve 22 interposed in a water system. An electric motor 23 is affixed to the mounting plate 21 with its rotor axis vertically disposed. A pulley 25 is carried fast on the motor shaft near its bottom end (see Fig. 3), and between the mounting plate 21 and the standard front wall 17 is a compression spring which urges the mounting plate in a rearward direction.

At its upper end the standard 15 carries means for extruding the concentrate from its package and for simultaneously forcing the concentrate to flow therefrom in the form of strings or narrow cords which are readily liquified. In the present instance, this means comprises a receptacle for the package which here take the form of a cylindrical mashing cup 25 having a bottom 26 with discharge openings 27 and an outwardly flared top edge or mouth 28. The mashing cup is removably supported within an annular ring 29 permanently affixed to the standard 15. The cup 25 is removably supported to facilitate its cleansing whenever needed. To guard against accidental removal of the cup, the ring 29 is provided with grooves 30 at diametrically opposite points and the cup is provided with radially projecting pins 31 also at diametrically opposite points and so spaced relative to the flared top edge of the cup as to be located below the ring 29 when the cup is in position (see Figs. 1 and 5). The functioning of this locking arrangement is, of course, well known.

Mounted on the standard 15 above and in vertical alignment with the mashing cup 25 is the remaining and cooperating part of the concentrate extruding means. Herein, as shown, this part comprises a plunger head 35 of a diameter very slightly smaller than the internal diameter of the mashing cup 25 so as to be receivable therein with a close fit. This plunger head is secured to one end of a plunger 36 formed with rack teeth 37 and slidable in a vertical guideway in a bracket 38 that extends forwardly from the standard 15 near its top. The plunger teeth 37 are engaged by a pinion 39 that is fixed on a shaft which is journaled in the bracket 38. An operating handle 40 is attached fast to a projecting end of the pinion shaft. In order that the plunger head 35 may be readily cleansed, it too is removably attached to the plunger 36. This is effected through the employment of a key 41 adapted to pass through registering openings in the plunger 36 and a hub 42 on the plunger head. One end of the key 41 is bent at right angles to form a limit stop and also to provide a grip for inserting or withdrawing the key; the other end may be bifurcated and spread apart slightly to resist withdrawal of the key (see Fig. 2).

Swingably mounted on the standard 15 intermediate its ends is a drip collecting bowl 45. This bowl has (a) an operative position beneath and in vertical alignment with the mashing cup 25 and (b) an inoperative position when swung from beneath the mashing cup to permit positioning of a mixing cup 46 in a holder 47 of cup form that is axially aligned with the mashing cup 25. The bowl 45 is removably mounted on a swingable arm 50 pivoted at one end in a journal 51 on the side of the standard 15. The arm 50, and hence the bowl 45, is by a torsion spring 52 urged to swing the bowl to its operative position beneath the mashing cup 25. At its free end the arm 50 (see Fig. 4) is formed with a bent-up finger 53 which is receivable within an axial socket that is provided in a boss 54 upstanding from the bottom of the bowl interiorly thereof. The finger 53 thus supports the bowl which may be quickly and easily removed from its supporting arm 50 so as to facilitate cleansing thereof.

To permit direct and convenient discharge of the concentrate into the mixing cup 46 and to assure thorough comminution of the concentrate and mixing thereof with the added ingredients, the mixing cup is here shown to be of the type which has a bottom 55 supporting upstanding side walls that are inclined slightly outwardly to define an open top. A pair of oppositely disposed flat blades 56 having relatively sharp leading edges are disposed in a plane parallel with the cup bottom and spaced slightly upwardly therefrom. The blades 56 are carried fast at the upper end of a vertical shaft 57 which extends through a sealed bearing 58 that is affixed to the bottom 55 of the mixing cup 46. At its lower end the shaft 57 carries fast a disk 59 from which are oppositely extended two radial pins 60 (see Figs. 4, 6 and 10). Through the holder 47 is axially extended a rotatable shaft 62 which carries at its upper end a disk 63 whereon is mounted an upstanding driving pin 64 eccentrically thereof. This pin is engageable with either radial pin 60 projecting from the disk 59 so as to transmit rotation to the shaft 57 and blades 56 carried thereby. Whenever the mixing cup 46 is operatively positioned within the holder, the mixing cup is supported on several rubber mountings 65 projecting radially inwardly of the holder 47, and when so positioned the mixing cup 46 is axially aligned with the shaft 62 and held against rotation relative thereto. A pulley 66 carried by the shaft 62 adjacent its lower end is fitted with an endless belt 67 which passes over the motor pulley 25 to be driven thereby.

It is a feature of this invention that the restoring ingredient (such as water) that is added to the concentrate is automatically fed thereto while comminution and mixing of the concentrate takes place, thereby to expedite the operation involved. To that end a supply pipe 70 is led from a supply source into the standard housing 15 to connect with the inlet side of the solenoid operated valve 22; and therefrom a section of pipe 71 extends outwardly of the standard housing to a point close to one side of the mixing cup 25 adjacent its bottom. The discharge end of the pipe 71 is provided with a wide opening 72 oppositely of the cup so that a relatively wide stream of water at relatively low pressure will be delivered to the cup side exteriorly thereof to be spread laterally thereupon and then drop down therefrom in a diverging stream that covers a widespread area when it reaches the bottom of the mixing cup 46. A suitable pressure regulator (not shown) is interposed in the supply pipe 70 to assure a constant water pressure at the discharge of the pipe 71.

To control the period of mixing and also the quantity of ingredient added to the concentrate, the timer 20 is connected in circuit to control operation of the motor 23 and also opening and closing of the solenoid-operated valve 22. The timer 20 includes a motor 75 and a switch 76 which may be of the mercury type tiltable to a closed position by means of a manual push button 77 and to a circuit-open position through mechanism driven from the timer motor (see Fig. 8). In the control circuit the mixer motor 23, the solenoid of the valve 22, and the timer motor 75 are all connected in parallel, and the switch 76 is series-connected in one of the lead lines ahead of any of the remaining elements.

To start operation of the motor whereby to energize the solenoid for opening the valve, the button 77 is momentarily depressed. This tilts the switch 76 to close the circuit and energize both motors 75 and 23, and also the solenoid valve 22. This energization continues until, at the end of a predetermined time interval, the mechanism driven by the timer motor tilts the switch 77 back to the circuit-open position, thereby interrupting the supply of energy to the elements. Variation in the period of operation is obtained by setting of a stop 78 carried by an adjustable disk 79 and operable to engage a finger 80 which is connected with the timer motor to rotate therewith when in operation (see Fig. 1). This finger reaches a predetermined rotative at the time that the switch 76 is tilted to circuit-open position. When the timer motor is energized the finger 80 advances in a clockwise direction as far as the stop 78. The setting of this stop determines the duration of the mixing operation and also the quantity of water which is discharged to the mixing receptacle 46 inasmuch as the quantity is definitely related to the length of time of flow.

There is also provided an aeration control baffle in the form of a plate 85, which occupies a position diametrically within the mixing cup 46 in its lower region. As shown, opposite edges of this plate are slanted inwardly in conformity with the walls of the cup and are provided with oppositely extending flanges 86 each in spring-pressure engagement with the walls of the cup when fitted down tightly in place. Depending from each flange is a leg 87 adapted to rest on the cup bottom 55 to assure maintenance of the baffle in a fixed position of elevation. The lower edge 88 of the baffle is extended horizontally in spaced relation to (a) the cup bottom and (b) the blades 56 whose circular movement path is intermediately of the bottoms of the cup and baffle. The height of the baffle lower edge 88, i. e. its vertical spacing from the cup bottom 55, is an important factor in the control of aeration which takes place during the mixing operation. The baffle plate 85 should be so designed as to occupy a vertical diametric position within the mixing cup at a predetermined point above its bottom, if there is to be control of the aeration entering into the treated beverage product. For more air, the baffle plate should be higher, and for less air it should be lower.

Having described the method and the particular apparatus adapted to facilitate carrying out of the method, a brief description of the operation will be given in order to further clarify the disclosure. Let it be assumed that a selected fruit juice has been reduced to a concentrate and packaged in bags of the size and shape above described, and that the concentrate has been kept properly refrigerated up to the moment that it is to be converted to a palatable food product by a restaurant or soda fountain. A package of the concentrate is first removed from the refrigerator and slitted in its middle region by cutting of one of its plastic walls. The package is then folded back upon itself and placed in the mashing cup 25 with the exposed faces of the concentrate facing the cup bottom 26 (see Fig. 2). The handle 40 is then operated to force the plunger head 35 downwardly into the mashing cup, and in so doing to squash the package therewithin. As a result, the concentrate is displaced from the package and extruded through the openings 27 of the cup bottom in the general form of strings or cords. Escape of the concentrate from the package is facilitated because the temperature differential existing between the cold package and the relatively warm (room temperature) sides of the mashing cup 25 and the plunger head 35 causes a slight thawing of the concentrate to take place with a resulting lubricant to be formed between the package and the concentrate.

The concentrate is forced through the bottom wall openings 27 after the manner of a die, and the extruded filament-like strings or cords will thereupon tend to break apart into short lengths because of the very low tensile strength of the frozen concentrate. These pieces of the concentrate drop freely to the bottom of the mixing cup 46 where they lie in a mass within the rotary movement path of the blades 56. A momentary pressure upon the starter button 77 starts operation of the motor 23 to produce rotation of these blades, thereby to cut through the mass of small pieces and comminute the concentrate for a predetermined period simultaneously with release of an exact quantity of water into the mixing cup. In a few seconds the concentrate is restored to a whole food product ready to be served and drunk. The operation is both precise and brief, and requires but a few seconds from the time that the concentrate is removed from the refrigerator until the product is ready for pouring and consumption. There is accordingly full assurance of a consistently uniform product rich in vitamins and other food values, with no opportunity for any loss or deterioration to take place.

When the timer cuts off the mixer motor 23 and closes the solenoid valve 22, the mixing cup 46 is removed from its holder and the beverage, then completely comminuted and liquified, is ready for pouring into a serving glass. As an incident to this pouring operation, the bowl 45 is automatically swung beneath the mashing cup 25 into position to catch any concentrate that may drip therefrom. Restoration of the mixing cup 46 to its operative position is just as simple for, when pressed against the bowl 45, the latter will be swung to one side to make way for the former.

For preparing a single beverage drink, the mixing cup 46 should be of such size as to accommodate below its baffle 85 all the pieces of frozen concentrate which are to be cut, comminuted and liquified by operation of the blades 56. If a greater quantity of the beverage is to be prepared with each operation, then the height of the baffle plate should be increased so that its lower edge 88 will stand above the higher level of the concentrate which is to be operated upon. When rotation of the blades is started, the mass of concentrate, already somewhat softened, is broken up and comminuted in a very few seconds at the same time, through operation of the solenoid valve, water is released into the mixing cup to be added to the concentrate. An effective diffusion of the concentrate within the water then follows.

At the start of the mixing operation, the rotating blades 56 transmit a primary whirling motion to the surrounding mass of concentrate which initially is free to revolve within the space below the baffle 85. At this stage there is little or no interference offered by the baffle plate since the level of the concentrate pieces stands at about the line $x$ (see Fig. 10). With the addition of water, however, the level of material undergoing treatment is raised concurrently with its comminution and liquefaction. When the level rises above the lower edge 88 of the baffle and continues upwardly therebeyond, an increasing interference with the primary whirling motion of the mass is developed. As a result, the initial whirling motion at the bottom of the mixing cup is slowed while other secondary whirling motions, revolving in opposite directions, are started in the two segmental compartments on opposite sides of the baffle. These secondary whirling motions of the treated material are relatively placid and do not produce any appreciable injection of air. The planes of these secondary whirling motions are vertical, and each is driven by the primary whirl in the area surrounding the blades. As a result, during substantially the entire stage of rising liquid within the mixing chamber from the low level $x$ to the topmost level $y$, the several whirling motions proceed without any substantial injection of air into the fluid material under treatment. This is of considerable importance in preparing a beverage from a citrus fruit where the presence of air should be carefully controlled. With other beverages, however, such as a milk shake, a high degree of aeration is desirable, and such an objective can be attained with the present apparatus by use of a baffle control plate which is elevated off the bottom of the mixing cup by a somewhat greater distance.

We claim:

1. The method of preparing a food product from a fruit juice concentrate comprising the steps of maintaining the concentrate at a temperature well below freezing until use and in a flexible package containing only sufficient concentrate for a normal serving for one individual, preliminarily mashing the concentrate as an incident to discharge thereof from its package through collapsing thereof, repeatedly and rapidly cutting through the mass of concentrate to effect a final comminution and melting thereof, and simultaneously adding water, the water being added at a rate so that the required volume is added within the time allowed for the final comminution of the concentrate.

2. The method of preparing a food product from a frozen concentrate contained within a flexible package wherein is provided a slit comprising the steps of fitting the package into a cup in whose bottom is a plurality of discharge holes, of subjecting the entire package while in the cup to a pressure which is exerted in a direction toward the cup bottom to extrude the concentrate outwardly from the package and then through the cup holes in relatively small pieces for transfer into a mixing cup, and in advancing edgewise through the mass of concentrate pieces a blade which follows a predetermined path to comminute the concentrate while simultaneously introducing into the mixing cup throughout the period of blade operation a fixed quantity of water into which the concentrate is diffused as it is liquified.

3. The method of preparing a food product from a packaged frozen concentrate comprising the steps of preliminarily extruding the concentrate from its package into relatively small pieces, simultaneously adding water to the small pieces of the concentrate and subjecting the mixture to the cutting action of a revolving blade to complete the comminution of the concentrate and its diffusion in the water, and imposing crosswise of the rotary path of the blade a baffle to oppose whirling motion of the mass of concentrate and water thereby to control aeration thereof.

4. The method of preparing a food product from a packaged frozen concentrate comprising the steps of extruding the concentrate from its package by a collapsing thereof and, as an incident to the extruding, reducing the concentrate to small pieces, repeatedly and rapidly cutting through the mass of concentrate to effect a final comminution and melting thereof, and simultaneously adding water, the water being added at a rate so that the required volume is added within the time allowed for the final comminution of the concentrate.

References Cited in the file of this patent

UNITED STATES PATENTS

| Number | Name | Date |
|---|---|---|
| 419,200 | Kahlenberg | Jan. 14, 1890 |
| 1,166,568 | Wilton | Jan. 4, 1916 |
| 1,416,332 | Chance | May 16, 1922 |
| 1,480,914 | Poplawski | Jan. 15, 1924 |
| 1,665,728 | Canright | Apr. 10, 1928 |
| 1,940,353 | Jenkins | Dec. 19, 1933 |
| 1,958,570 | Flegel | May 15, 1934 |
| 2,014,325 | Grilli | Sept. 10, 1935 |
| 2,392,452 | Baumann | Jan. 8, 1946 |
| 2,429,909 | Allman | Oct. 28, 1947 |
| 2,517,073 | Alvarez | Aug. 1, 1950 |
| 2,568,840 | Zees | Sept. 25, 1951 |
| 2,589,221 | Burgess | Mar. 18, 1952 |
| 2,613,488 | Attride | Oct. 14, 1952 |

FOREIGN PATENTS

| Number | Country | Date |
|---|---|---|
| 11,328 | France | Jan. 19, 1910 |